July 8, 1958
W. N. GOODWIN, JR
2,842,679
PHOTOELECTRIC CONTROLLER
Filed March 4, 1952
2 Sheets-Sheet 2
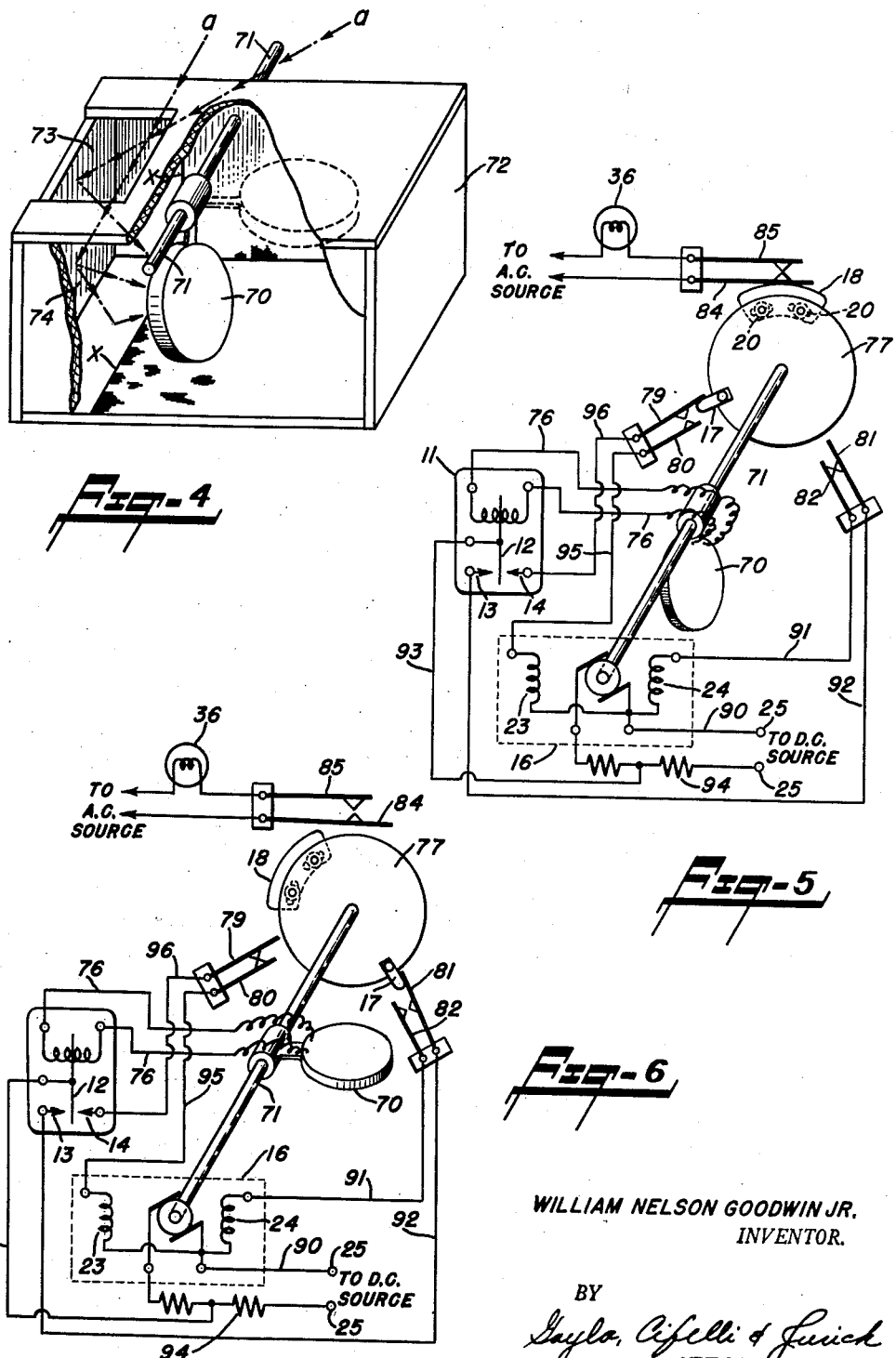
WILLIAM NELSON GOODWIN JR.
INVENTOR.
BY
Gaylor, Cifelli & Junick
ATTORNEYS United States Patent Office 2,842,679
Patented July 8, 1958

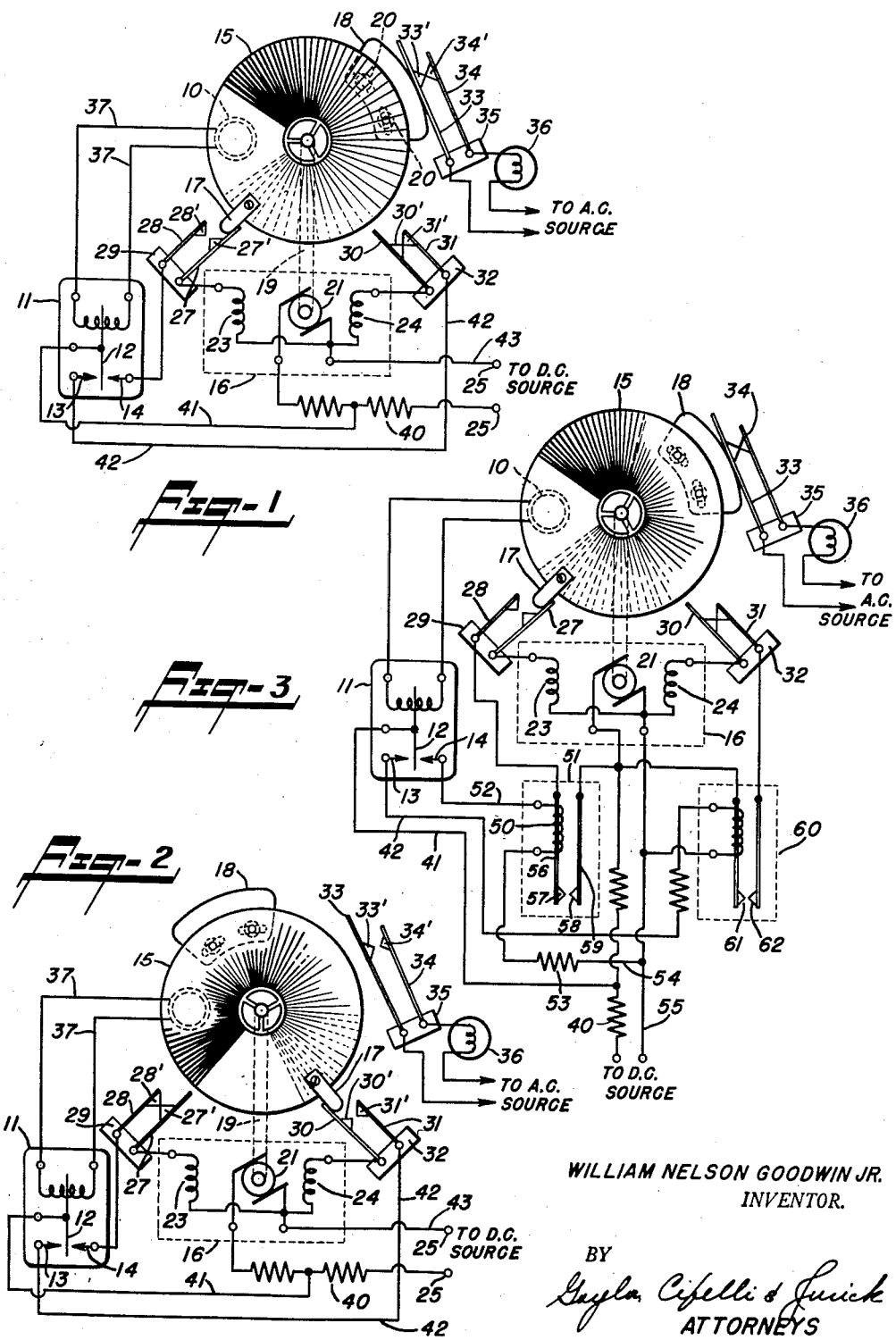
July 8, 1958     W. N. GOODWIN, JR     2,842,679
PHOTOELECTRIC CONTROLLER
Filed March 4, 1952     2 Sheets-Sheet 1
WILLIAM NELSON GOODWIN JR.
INVENTOR.

2,842,679

PHOTOELECTRIC CONTROLLER

William Nelson Goodwin, Jr., Newark, N. J.

Application March 4, 1952, Serial No. 274,806

10 Claims. (Cl. 250—205)

This invention relates to controllers and more particularly to a photoelectric type light controller of novel construction wherein the photoelectric cell is subjected only to relatively low light intensities.

Photoelectric controllers of the type contemplated by this invention employ a photocell, a sensitive relay responsive to the photocell current and a suitable power mechanism for controlling various devices in accordance with definite levels of illumination falling on the photocell. In the case of a light controller, the power mechanism controls the energization and de-energization of lamps, for example street lights which should be lit at night and extinguished during the daytime. While a self-generating, barrier layer type of photocell offers certain advantages with respect to light controllers, any type of light sensitive device may be utilized. Thus, in the case of a street light controller employing a barrier layer cell, the photocell generates a current that varies with the amount of illumination striking the photocell surface. When the light intensity falls, as at dusk, to a predetermined value, one set of relay contacts closes whereby the associated mechanism is caused to "turn on" the street lights. Then, when the light intensity increases, as in the morning, to a predetermined value, the other set of relay contacts closes whereby the mechanism "turns off" the street lights.

In prior controllers of this type, the relay contact closures are effected when the light intensity striking the photocell decreases or increases to the predetermined values and such closure of the relay contacts starts an operating cycle whereby the associated mechanism energizes or de-energizes the street lights. My novel controller, however, is so arranged that numerous closures of the sensitive relay contacts may occur prior to actual energization and de-energization of the lights. The practical advantage of a controller made in accordance with this invention lies in the fact that the photocell is never exposed to a light intensity sufficient to cause possible damage to the photocell.

Since, in a conventional light controller, the photocell is fully exposed during the daylight hours it is apparent the photocell is exposed to intense light during the brightest period of the day. Such high light intensities eventually damage the surface of the photocell resulting in expense and trouble from a servicing standpoint. In my controller the photocell, while continuously exposed to light, is never subjected to illumination intensities materially greater than the minimum value required for operation of the controller, namely, approximately one (1) foot candle. It is known from experience that under such conditions the barrier layer photocell has a very long operating life.

An object of this invention is the provision of a novel photoelectric controller wherein the photocell is subjected only to relatively low light intensities.

An object of this invention is the provision of a photoelectric controller comprising a sensitive relay responsive to the current output of a photocell, a motor controlled by closure of the relay contacts and a mechanism actuated by the motor, said mechanism altering the quantity of light striking the photocell surface and controlling the actuation of a load device.

An object of this invention is the provision of a photoelectric controller comprising a rotatable optical wedge, a motor for rotating the wedge in response to the closure of the contacts of a sensitive relay, a photocell optically associated with the wedge and controlling closure of the relay contacts and means controlled by the rotation of the wedge for energizing and de-energizing a load device.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic illustration of a photoelectric light controller made in accordance with this invention, the device being shown in the position wherein the load is energized;

Figure 2 is similar to Figure 1 but showing the device in the position wherein the load is de-energized;

Figure 3 illustrates another embodiment of the invention including time-delay means to prevent operation of the controller in response to passing clouds, lighting, etc.;

Figure 4 is a fragmentary, isometric view, with parts broken away, of another embodiment of the invention wherein the photocell is rotatable within a housing to receive more or less light reflected from the housing walls; and Figures 5 and 6 are diagrammatic representations somewhat similar to those of Figures 1 and 2 but related to the construction shown in Figure 4.

While the following description and the illustrated embodiments of the invention are limited to a street light controller, it will be apparent the invention is not restricted to such specific application. As a practical matter, the device is useful in any application wherein electrical equipment or alarm devices are to be controlled in response to a predetermined level of light intensity falling upon a photocell.

Reference is now made to Figure 1 wherein there is shown a photocell 10 connected to the movable coil of a sensitive relay 11, said relay having a movable contact 12 and a pair of stationary contacts 13, 14. Disposed over the photocell is a light-altering means in the form of a light filter 15. The filter 15 constitutes an optical wedge which is rotatable in either direction by a motor 16 and the transparency of the filter varies gradually from approximately 100 percent to substantially 0, as illustrated by the shading. Thus, in the position shown in Figure 1, substantially all the light striking the filter area immediately over the photocell will fall upon the photocell surface. On the other hand, when the dense portion of the filter overlies the photocell, the major portion of the light rays will be blocked by the filter and only a small percentage of the light will actually strike the photocell surface. Extending radially from the filter disc are a finger-like member 17 and an elongated cam member 18, each secured to the disc by suitable means such as the screws 20 which pass through the member into threaded holes provided in the disc. It will be apparent that by providing arcuate slots in the members 17 and 18 these members are subject to a certain amount of positional adjustment along the circumference of the disc. It may here be pointed out that the members 17 and 18 are secured to opposite surfaces of the disc whereby these members lie in different planes so as not to interfere with the operation of associated switches, as will be described in more detail hereinbelow.

As shown in the drawings, the filter is secured to a shaft 19, by any suitable means, that is mechanically coupled to the armature 21 of the reversible motor 16. For purposes of simplicity, the motor 16 is shown as a D.-C. motor having reversing field windings 23, 24, energy being obtained from a suitable D.-C. source connected to the terminals 25.

A first motor-control switch, comprising the flexible blades 27, 28, is supported in fixed position relative to the filter disc 15 by an insulator block 29, said blades carrying the contacts 27′, 28′, respectively. A second, similar switch, comprising the flexible blades 30, 31, is supported by the insulator block 32, said blades carrying the contacts 30′, 31′, respectively. These motor-control switches are normally closed and are so spaced from the circumference of the filter disc that the end of the long blades 27 and 30 extend into the arcuate path of travel of the member 17 whereby such member will engage and flex the long blade upon rotation of the filter disc. The positions of these motor-control switches define the extreme limits of rotation of the filter disc, the opening of one or the other of the switches deenergizing the motor at the proper point in the operating cycle of the device. Thus, when the filter disc 15 rotates in the counterclockwise direction the limit of such rotation is established at the point where the member 17 flexes the switch blade 27 to open the contacts 27′, 28′. Similarly the limit of clockwise rotation of the disc is established when the member 17 flexes the switch blade 30 to open the contacts 30′, 31′.

A load-control switch, comprising the flexible blades 33, 34, carrying the contacts 33′, 34′, respectively, is supported in relatively fixed position by the insulator block 35. The long switch blade 33 is adapted for flexing by the cam member 18, carried by the disc 15, to establish closure and opening of the contacts 33′, 34′ in response to rotation of the member 18. It is here pointed out that the member 17 may comprise a relatively narrow, flat rod secured to the upper surface of the filter disc and the cam member 18 may comprise a flat plate secured to the lower surface of the disc. Also, the motor-control switches are positioned in the plane of the member 17 whereas the load-control switch is positioned in the plane of the cam 18. Consequently, the member 17 will actuate only the motor-control switches and the cam 18 will actuate only the load control switch, irrespective of the extent of the angular rotation of the filter disc. As shown, the load-control switch blades 33, 34 are connected in series with an A.-C. power source and the lamp 36, said lamp representing the street light or lights controlled by the controller.

I have already indicated that the switch-actuating members 17 and 18 are independently adjustable along the circumference of the filter disc to establish switch operations at desired operating points with respect to rotation of the filter disc. It will be apparent the motor-control switches and the load control switches may also be mounted to permit arcuate adjustment thereof along the circumference of the filter disc for similar purposes.

The photocell 10 is connected to the movable coil of the sensitive relay 11 by the leads 37, the polarity being such that the relay movable arm 12 rotates toward the Low contact 14 with decreasing light intensity. As shown in Figure 1, the apparatus is in the position wherein the lamp 36 is energized and the finger member 17 has moved far enough to flex the blade 27 to cause opening of the contacts 27′, 28′. This represents the "at dusk" or "night" position of the apparatus. Although the most transparent portion of the filter disc overlies the photocell, the intensity of the light striking the disc is relatively low, usually of the order of one (1) foot candle or less. Upon a further decrease in the light intensity the output of the photocell decreases and may even result in a closure of the relay contacts 12, 14. Since the relay contact 14 is connected in series with the motor-control switch blades 27, 28, closure of the relay contacts 12, 14 results in no further rotation of the filter disc.

With the approach of dawn, the general light intensity increases resulting in an increased current output from the photocell, such increase in current eventually causing a closure of the relay contacts 12, 13. Upon closure of these relay contacts, the power circuit is completed to the motor field winding 24, the circuit comprising the current-limiting resistor 40, wire 41, relay contacts 12, 13, wire 42, switch contacts 30′, 31′, motor field winding 24 and wire 43. The motor armature now rotates to revolve the filter disc 15 in a clockwise direction, it being apparent the rotation of the disc can be made to be relatively slow by appropriate gearing interposed between the motor armature and the shaft to which the disc is attached. A clockwise rotation of the filter disc results in a denser portion of the disc being brought directly over the photocell thereby reducing the quantity of light that actually strikes the photocell surface and producing a separation of the relay contacts 12, 13. The separation of such relay contacts opens the circuit to the motor field winding 24 terminating the rotation of the filter disc. As the intensity of the light increases further, this action of the apparatus, just described, is repeated. Eventually, the angular, step by step, rotation of the filter disc removes the cam 18 from engagement with the flexible blade 33 of the load-control switch whereby the switch contacts 33′, 34′ become separated and the lamp 36 is de-energized, as shown in Figure 2. Even though the lamp is "out" the continually-increasing general light intensity causes further step by step operation of the apparatus thereby interposing a more and more opaque portion of the filter disc over the photocell. Eventually, the finger member 17 flexes the switch blade 30 resulting in an opening of the electrical circuit to the motor field winding 24, after which a further closure of the relay contacts 12, 13 is ineffective. Therefore, the apparatus remains substantially in the position shown in Figure 2 throughout the daylight hours.

With the coming of dusk the daylight intensity decreases, such decreases eventually causing a closure of the other relay contacts 12, 14. Since the motor-control contacts 27′, 28′ are now closed, a closure of the relay contacts 12, 14 energizes the motor field winding 23 producing a counterclockwise rotation of the filter disc. Such counterclockwise rotation brings a more transparent portion of the filter disc over the photocell increasing the amount of light transmitted to the photocell surface and bringing about a separation of the relay contacts 12, 14 and a de-energization of the motor field winding 23. As the general illumination is gradually decreasing with the approach of nightfall, the step by step energization of the motor field winding 23 continues until, eventually, the cam 18 flexes the switch blade 33 to cause a closure of the power circuit to the lamp 36. Excessive rotation of the filter disc is now prevented by a flexing of the switch blade 27, by the member 17, to cause separation of the motor-control contacts 27′, 28′, such condition of the apparatus being shown in Figure 1.

From the above description of operation it will be apparent the apparatus responds to a change in general light intensity (increasing or decreasing) and the response of the apparatus is always in a direction such that the amount of light actually striking the photocell surface is always of a low value.

It may here be pointed out that the discrete change in light intensity required to initiate operation of the apparatus for one operating cycle is determined by the sensitivity of the relay 11 and the spacing of the relay contacts 13, 14. This operating range of the relay can, of course, be set to a desired value in terms of the foot candles of light striking the photocell surface. In actual practice, a light controller would include a relay that closes its low contacts at about one (1) foot candle of light and its high contacts at about two (2) foot candles of light. Also, the actual point at which the lights are "turned on" and "turned off" can be set as desired by a positioning of the cam 18 at a predetermined point along the circumference of the filter disc or by positional adjustment of the load-control switch. Still further, the actual rotational range of the filter disc can be established within desired limits by a predetermined positioning of the motor-control switches and the degree of graduated opacity formed in the filter disc. Reference to Figure 2 shows that the general level of illumination falling upon the filter disc will always be balanced by the position of the dense portion of the disc over the photocell to maintain a low value of light falling on the photocell surface. Specifically, a further increase in the general illumination will cause a momentary closure of the relay contacts 12, 13 resulting in a disc rotation further toward the position where the opaque portion of the disc covers the photocell surface thereby separating the relay contacts. On the other hand, a decrease in the general illumination if ineffective so long as such decrease lies within the range of the spacing of the relay contacts 12, 14. In the event the light decreases beyond this range, the apparatus will merely operate to rotate the filter disc slightly to increase the exposure on the photocell surface.

In photoelectric light controller of the type under discussion, it is, of course, desirable that the device operate only when the lights are to be turned on or off for practical periods of time and that such operation of the lights be not affected by passing clouds in the daytime or lightning flashes in the nighttime. This can be accomplished in several ways. In the first place, the sensitive relay 11 can have an inherently slow response thereby eliminating contact closures due to transient light fluctuations on the photocell surface. Further, the cam member 18 can be made rather long so that considerable rotation thereof may take place without actual opening of the switch contacts 33', 34'.

In the event an additional time delay is desired between the time the sensitive relay contacts close and the motor is set into rotation, the controller can be modified as shown in Figure 3. Here the apparatus, essentially, is the same as shown in Figure 1 with time delay relays inserted between each of the stationary contacts 13, 14 of the sensitive relay 11 and the associated motor field winding. Closure of the relay contacts 12, 14 energizes the heater winding 50 of the time delay relay 51, the circuit comprising the resistor 40, wire 41, relay contacts 12, 14, wire 52, heater coil 50, resistor 53 and wires 54, 55. The heater winding 50 is wound over a bimetallic strip 56 that carries a contact 57 at one end, the other end of the strip being fixed relative to the relay base. The heat generated by current flowing through the winding 50 will cause the strip 56 to flex in the direction of the contact 58 carried by the blade 59. As is well known, the time delay relay may be designed and adjusted so that the heater winding must be energized for a predetermined time interval to effect a closure of the contacts 57, 58. Closure of the contacts 57, 58 energizes the motor field winding 23, at the proper time in the operating sequence of the apparatus. Similarly, the closure of the other sensitive relay contacts 12, 13, energizes the heater winding of a similar time delay relay 60 having contacts 61, 62 controlling the energization and de-energization of the other motor field winding 24. Since the power contacts of the time delay relays are normally open, it is apparent one or the other of the sensitive relay contact sets must remain closed for a significant time interval before the motor is energized.

Translated back to the photocell this means the change in the level of the illumination falling upon the filter disc must be of a sustained character to cause operation of the device as a whole. The effects of passing clouds or lightning flashes are, therefore, effectively eliminated and produce no rotation of the filter disc. While I have shown a single filter disc of graduated density as the means for continuously limiting the intensity of the light striking the photocell surface, other equivalent means may be employed for this purpose. Specifically, a pair of Polaroid filters may be disposed over the photocell, one filter being stationary and the other carrying the fingers 17 and cam 18 and rotatable by the motor. When the light axes of the filters are alined, a maximum percentage of light is transmitted therethrough. However, when one filter is rotated 90 degrees substantially no light passes through the series filters.

In the arrangements shown in Figures 1 to 3, the photocell is stationary and the amount of light striking the photocell surface is controlled by the filter disc that is rotatable relative to the photocell. Figures 4 to 6 disclose another embodiment of the invention wherein the photocell is rotatable and the amount of light striking the photocell surface is controlled by the angle of the photocell relative to a fixed surface.

Reference is now made to Figure 4. The photocell 70 is secured rigidly to the shaft 71 that passes through opposite walls of the housing 72. This housing is a substantially light-tight box provided with an opening 73 in the upper surface. In use, the opening 73 is presented to the source of illumination which, in the case of a street light controller, generally is the north sky. When the photocell is disposed in the position shown in the drawing, light rays $a$ pass through the opening 73, are reflected from the housing walls and strike the active surface of the photocell. The inner surface of the end wall 74 and the adjacent portions of the side walls, top and bottom of the housing are coated with a white paint or other good, light-reflecting medium, to promote good light reflection and diffusion. On the other hand, the inner housing walls lying to the right of the line X are made non-reflecting by the application of a coating of black paint. Thus, when the shaft 71 is rotated to position the photocell in a plane substantially parallel to the bottom of the housing, as shown by the dotted lines, little or no light will strike the photocell surface. These two extreme positions of the photocell may be considered as comparable to those wherein the filter disc, of the Figures 1–3 constructions, presents the clear or opaque portions, respectively, over the photocell. If, then, the photocell 70 is rotated between its two extreme positions in accordance with the changing quantity of light striking the inner, light-reflecting surfaces of the housing 72, specific angular positions of the photocell can be associated with an appropriate mechanism to turn the street lights on and off at predetermined levels of the general illumination.

Reference is now made to Figure 5 which is a diagrammatic representation of showing a light controller embodying the construction shown in Figure 4. The photocell 70, disposed in a substantially vertical position, as in the Figure 4 illustration, is connected to the movable coil of the sensitive relay 11 by the leads 76. A disc 77, made of suitable material such as a plastic, is secured rigidly to the shaft 71 and carries the cam member 18 and finger member 17. As explained hereinabove with reference to Figure 1, these members are adjustably secured in position by screws 20 passing through suitable slots and are adapted to operate suitable switches for controlling the motor 16 and a load such as the light 36. One motor-control switch comprises the normally-closed contact blades 79, 80 which establishes the limit of rotation of the shaft 71 in a clockwise direction by opening of the motor circuit at this point. The other motor-control switch comprises the blades 81, 82 which establishes the limit of shaft rotation in a counterclockwise direction. As shown in Figure 5, the switch blades 79, 80 are open. Since these switch blades are connected in series with the relay contacts 12, 14, closure of the relay contacts 12, 14, in response to a decrease in the quantity of light striking the photocell surface, does not energize the motor 16. Consequently the disc 77 cannot rotate further in the clockwise direction. Some time prior to the opening of the motor-control contacts 79, 80, the cam member 18 has caused a closure of the normally-open load-control contacts 84, 85 thereby energizing the lamp 36. The illustrated condition of the controller, therefore, is that which prevails throughout the nighttime. With the approach of dawn, the light intensity striking the housing walls, and reflected by such walls to the photocell, increases gradually and eventually causes a closure of the contacts 12, 13 of the sensitive relay 11. Closure of these relay contacts completes the power circuit to the motor, such circuit comprising the wire 90, motor field winding 24, wire 91, motor-control contacts 81, 82, wire 92, relay contacts 13, 12, wire 93 and resistor 94. The motor now rotates the shaft 71 and photocell in a counterclockwise direction. Upon such rotation of the photocell (see Figure 4) the angle between the active photocell surface and the inner housing walls is altered whereby the actual quantity of light striking the photocell surface is decreased. Consequently, rotation of the photocell, in this direction, continues until the decreasing output of the photocell results in an opening of the sensitive relay contacts 12, 13, whereupon the motor becomes de-energized. This step-by-step rotation continues as the general level of illumination increases until finally the finger member 17 causes an opening of the motor-control contacts 81, 82. Once the latter contacts open, a closure of the sensitive relay contacts 12, 13 results in no further rotation of the photocell and the condition of the apparatus is that which prevails during the daytime. Such daytime condition of the apparatus is shown in Figure 6 from which it will be clear that the load-control contacts 84, 85 are open and the photocell 70 is disposed in a substantially horizontal plane (see also Figure 4, dotted line position of the photocell). In such position of the photocell only a small quantity of light will actually strike the photocell surface even though the general daytime level of light intensity be very high.

With the approach of dusk the general level of illumination decreases causing a gradual reduction in the photocell output until the sensitive relay contacts 12, 14 close. Since the motor-control switch blades 79, 80 are now closed, closure of the relay contacts 12, 14 energize the motor 16, the circuit comprising the wire 90, motor field winding 23, wire 95, motor-control contacts 79, 80, wire 96, relay contacts 14, 12, wire 93 and resistor 94. The motor now rotates the shaft 71 in a clockwise direction which, effectively, exposes more of the photocell surface to light rays that are reflected from the inner walls of the housing. The resulting increase in output of the photocell causes an eventual opening of the sensitive relay contacts 12, 14 and de-energization of the driving motor. Such step-by-step, clockwise rotation of the motor continues with the gradually decreasing level of general illumination until the cam member 18 causes a closure of the load-control contacts 84, 85 and the finger member 17 causes an opening of the motor-control contacts 79, 80, the condition shown in Figure 5.

From the above-described operation of the Figures 4–6 embodiment of my invention, it will be apparent that the disc 77 carrying the switch-actuating finger 17 and cam 18 replaces the filter disc 15, of the Figures 1–2 embodiment of the invention in so far as mechanical operations are concerned. The optical function provided by the filter disc is, however, performed by altering the angle of the photocell relative to a light-reflecting surface. In both embodiments of the invention the photocell is never exposed to light intensities materially greater than that required for operation of the sensitive relay, specifically, a range of 1–2 foot candles. While I have illustrated both embodiments of the invention in diagrammatic form, to facilitate a proper understanding thereof, those skilled in this art will understand the entire apparatus may be contained in a suitable dust tight case provided with a transparent window of suitable size to permit the entrance of light necessary for actuation of the photocell.

Having now described my invention those skilled in this art will have no difficulty in making various changes and modifications in the individual parts or their operative assembly to meet specific design requirements. The photocell, driving motor and switches are subject to a wide latitude of design choice. The extent of rotation of the filter disc (Figure 1) and the photocell (Figure 4) may be greater or less than that shown in the illustrations. The essential feature of the invention resides in an arrangement wherein the photocell is continuously exposed to light but the intensity of the light actually striking the photocell surface is at all times limited to a relatively low, safe value by suitable light-altering means interposed between the photocell and the source of light. The means for so limiting the light reaching the photocell serves to actuate the load control switch.

I claim:

1. A system responsive to changing light conditions comprising a photocell exposed to the light and providing an electrical output that varies in accordance with the quantity of light striking its surface; light-altering means disposed in the path of light striking the photocell surface to maintain the quantity of light striking the photocell surface within a predetermined range; power means to vary the relative position of the light-altering means and the photocell; means responsive to the photocell output and actuating the power means when the photocell output varies beyond the said predetermined range, such actuation of the power means altering the relative position of the light-altering means and the photocell to maintain the quantity of light striking the photocell surface within the said predetermined range; and control means actuated upon a predetermined relative movement between the light-altering means and the photocell.

2. The invention as recited in claim 1, wherein the light-altering means comprises a rotatable, graduated-density disc, and said power means is a reversible electric motor having a shaft coupled to the disc, and including means limiting the change in the relative position of the disc and the photocell to a predetermined maximum extent.

3. The invention as recited in claim 1, wherein the photocell is disposed within a housing having an aperture presented to the light, and the light-altering means includes an inner, light-reflecting wall of the housing.

4. The invention as recited in claim 1, including time-delay means effective to delay actuation of the power means by the means responsive to the photocell output.

5. A system responsive to changing light conditions comprising a photocell exposed to the light and providing an electrical output that varies in accordance with the quantity of light striking its surface; a graduated-density, rotatable member disposed over the photocell surface, said member adapted to maintain the quantity of light striking the photocell surface within a predetermined range; a sensitive relay responsive to the output of the photocell and closing a set of contacts when the quantity of light striking the photocell surface varies outside of the said predetermined range; an electric motor mechanically coupled to the rotatable member and energized upon closure of said contacts, said motor rotating the disc in one direction or the other and to an extent required to maintain the quantity of light striking the photocell surface within the said predetermined range; and control means actuated upon a predetermined rotation of the rotatable member.

6. The invention as recited in claim 5, including a time-delay relay interposed between the sensitive relay contacts and the motor and including means limiting the rotation of the rotatable member to a predetermined maximum extent.

7. A system responsive to changing light conditions comprising a photocell exposed to the light and providing an electrical output that varies in accordance with the quantity of light striking its surface; a rotatable disc disposed over the photocell surface, said disc having a progressively-varying light-transmitting characteristic; a sensitive relay responsive to the photocell output said relay having a set of high and a set of low contacts adapted to close when the changing light condition alters the quantity of light striking the photocell so that it exceeds or falls below a predetermined range of values; a reversible motor mechanically coupled to the disc and energized for rotation in one direction or the other upon closure of one or the other sets of sensitive relay contacts, said motor rotating the disc to an extent required to maintain the quantity of light striking the photocell surface within the said predetermined range of values; control means actuated upon a predetermined angular rotation of said disc; said means limiting the rotation of the disc to a predetermined maximum extent in each direction.

8. A system responsive to changing light conditions comprising a housing having a light-admitting aperture therein; a photocell pivotally mounted within the housing to receive light passing through the aperture and reflected from an inner wall of the housing, said photocell providing an electrical output that varies with the quantity of light striking its surface; a sensitive relay responsive to the photocell output and having a set of high and a set of low contacts adapted to close when the changing light condition alters the quantity of light striking the photocell surface so that it exceeds or falls below a predetermined range of values; a reversible electric motor mechanically coupled to the photocell and energized for rotation in one direction or the other upon closure of one or the other sets of sensitive relay contacts, said motor altering the position of the photocell relative to the inner wall of the housing to maintain the quantity of light striking the photocell surface within the predetermined range of values; and control means actuated upon a predetermined movement of the photocell.

9. The invention as recited in claim 8, wherein the photocell is secured to and extends radially of a shaft that is coupled to the motor, and wherein said control means is actuated by the said shaft.

10. In a light sensitive circuit responsive to changing light conditions for control purposes and including a photocell providing an electrical output that varies with the quantity of light striking its surface and control means to effect a control function when the photocell output exceeds a predetermined magnitude; the improvement for preventing damage to the photocell by excessive light, said improvement comprising light-altering means disposed in the path of light striking the photocell surface, means actuated when the photocell output exceeds the said predetermined magnitude to alter the relative position between the light-altering means and the photocell to reduce the light striking the photocell surface below the said predetermined magnitude.

References Cited in the file of this patent

UNITED STATES PATENTS

| | | |
|---|---|---|
| 1,626,663 | Brace | May 3, 1927 |
| 1,881,521 | Gstyr | Oct. 11, 1932 |
| 2,065,421 | Bernarde | Dec. 22, 1936 |
| 2,123,470 | Lamb | July 12, 1938 |
| 2,346,794 | Seeger | Apr. 18, 1944 |
| 2,575,951 | Gilbert | Nov. 20, 1951 |
| 2,601,182 | Tyler | June 17, 1952 |